Nov. 1, 1927.
S. RUBIN
1,647,933
AUTO FENDER
Filed March 18, 1927
2 Sheets-Sheet 1
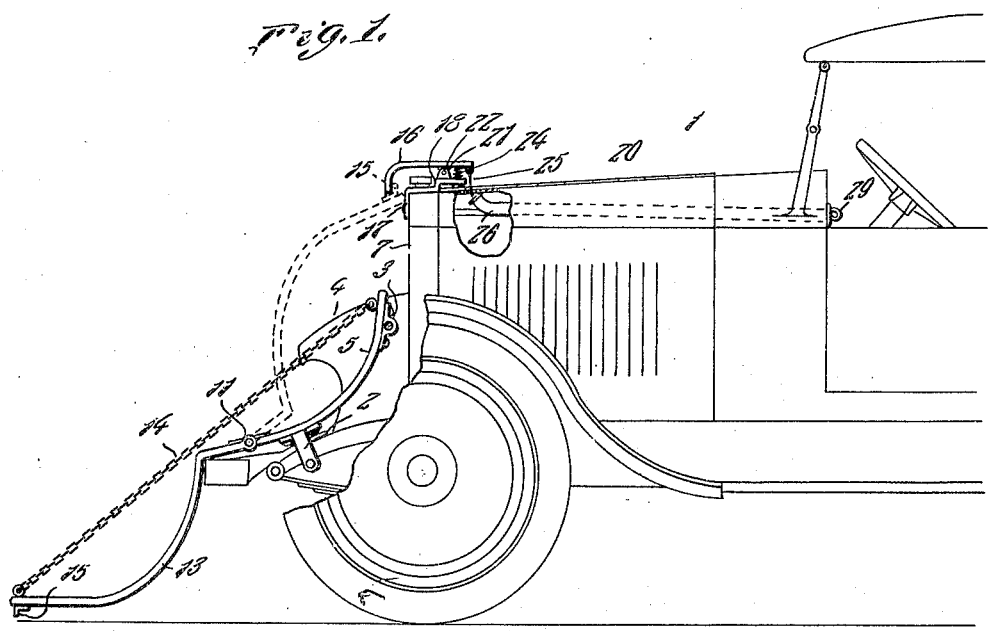
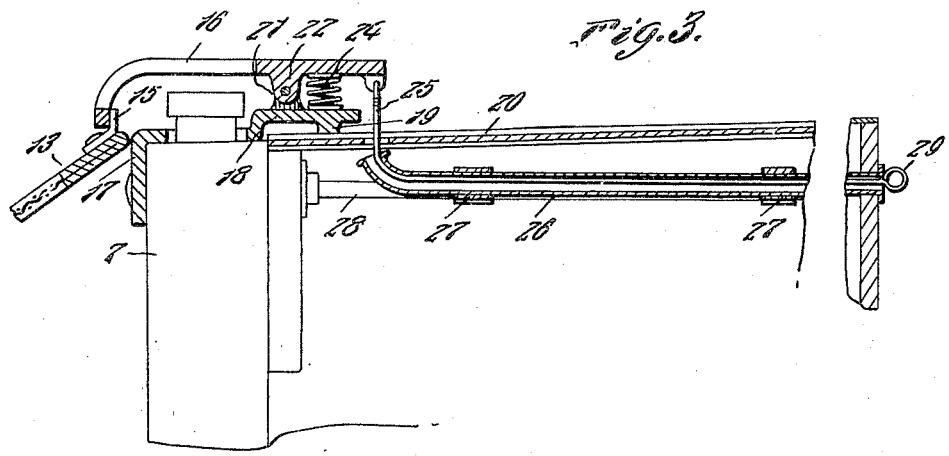
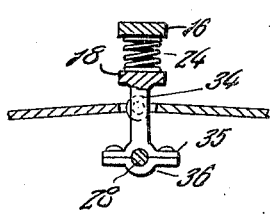
Samuel Rubin
INVENTOR
BY Victor J. Evans
ATTORNEY Nov. 1, 1927.

S. RUBIN

AUTO FENDER

Filed March 18, 1927

Samuel Rubin
INVENTOR

BY Victor J. Evans
ATTORNEY

Patented Nov. 1, 1927.

1,647,933

UNITED STATES PATENT OFFICE.

SAMUEL RUBIN, OF BROOKLYN, NEW YORK.

AUTO FENDER.

Application filed March 18, 1927. Serial No. 176,504.

My present invention has reference to an improved fender for automobiles.

My object is the provision of a fender for the front of an automobile that comprises a fixed section or guard and a swingable section or scoop, the said scoop being foldable over the guard and engaged by a latch supported on the radiator of the automobile, there being means connected with the latch and directed into the automobile for releasing said latch and also means for swinging the scoop away from the guard toward the ground and receiving therein pedestrians or other obstacles in the path of the automobile, there being means for limiting the swinging movement of the scoop away from the guard so that the said scoop will be firmly supported when in active position.

A further object is the provision of a fender for automobiles which is in the nature of a life guard and which is arranged on the front of the automobile in a manner to serve as a protector for the radiator, while not interfering with the free passage of air through said radiator and which is normally latched and which, when released from this position is automatically swung to receive therein a person or obstacle in the path of the automobile.

A further object is the provision of a fender for this purpose which shall be of a simple construction, which can be easily, quickly and effectively secured on an automobile without altering the construction of the machine.

To the attainment of the foregoing and other objects which will present themselves as the nature of the invention is better understood, the improvement also resides in certain other novel features of construction, combination and operative association of parts, a satisfactory embodiment of which is disclosed by the accompanying drawings.

In the drawings:

Figure 1 is a side elevation of an automobile provided with the improvement.

Figure 3 is a detail enlarged sectional view approximately on the line 3—3 of Figure 2.

Figure 5 is a detail sectional view to illustrate another manner in which the support for the latch may be attached to the automobile.

Figure 2:
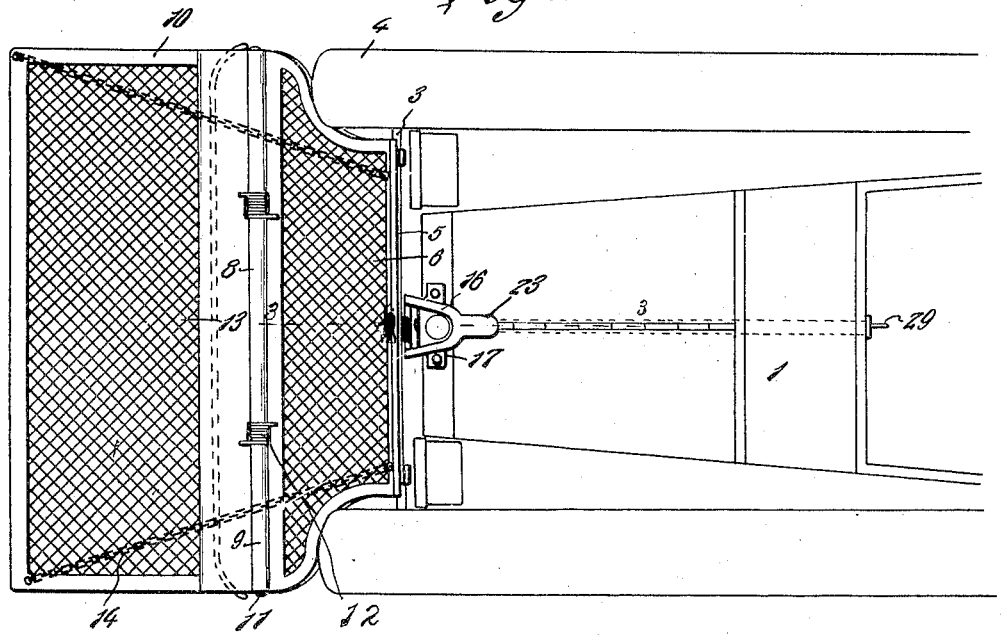
Figure 2 is a top plan view thereof.

In certain views of the drawings there is illustrated the forward portion of an automobile 1. Secured by brackets 2 to the spring supports for the front springs of the automobile, and likewise by a rod 3 to the inner faces of the front mudguards 4 of the machine, there is the fixed member 5 of the improvement. The member 5 is in the nature of a guard, and comprises a concave or dished frame on which is secured a woven wire or other reticulated facing 6. It is to be noted that the guard member 5 is disposed forward of the radiator 7 of the automobile and the reticulated facing 6 thereof does not interfere with the passage of air currents through the radiator. The outer edge of the frame of the guard 5 is rolled or otherwise provided with spaced barrels 8 that receive therebetween other barrels 9 formed on the inner edge of the frame 10 of the outer member or scoop of the fender: A pivot pin 11 passes through the barrels 8 and 9 and the pin, between the barrels, is surrounded by coil springs 12 whose ends are bent in opposite directions to contact respectively with the frames 5 of the guard and 10 of the scoop. By this arrangement it will be seen that the scoop will normally swing away from the guard. By reference to Figure 2 of the drawings it will be seen that the inner corners of the frame for the guard 5 are concaved or rounded inwardly so that the mud guards 4 of the automobile 1 pass thereover. This widens the outer portion of the guard, and the frame 10 is of a width corresponding with that of said widened portion of the guard. The frame 10 has a covering of mesh or other reticulated material, as indicated by the numeral 13. The frame 10 is dished as clearly disclosed by the drawings and flexible elements 14 provide the connecting means between the frames 5 and 10. The flexible elements are preferably in the nature of chains and tend to hold the scoop when the latter is swung to active position as illustrated by Figures 1 and 2 of the drawings.

The outer edge of the frame, or what I will term its outer face, has secured thereon a lip or flange 15 that is designed to be engaged by a catch member 16 supported on the top of the radiator 7. The support for the catch comprises an angle plate 17 whose upper portion is formed with an opening for the filler spout for the radiator. The top of the flanged plate 7 is riveted or otherwise secured to the top of the radiator casing as is the outer portion or flange thereof. The rear of the plate is slightly upturned but continued longitudinally, as at 18, and this portion is formed on its under face with a lug 19 that centrally contacts with the hinge connection for the hood sections 20 of the automobile. The part 18 of the angle plate 17 is formed with spaced ears 21 between which there is received and pivoted a lug 22 that is formed on the inner face of the catch 17. Outward of the lug the catch is widened and slotted, the outer extremity thereof being round, as at 23. The portion 22 provides the active end of the catch and is designed for engagement with the lip or flange 15 on the scoop. The catch is influenced to such engagement through the medium of a spring 24. The inner end of the catch on its under face may have connected thereto a flexible element 25 which passes through an opening in the hood 20 and is directed through a tube 26 supported by means 27 from the tie rod 28 between the radiator and the dash of the automobile. The tube extends through the dash and through the instrument board of the automobile and the element 25 has fixed on its free end a ring member 29 that contacts with the mouth of the tube but which is engageable by the finger of an occupant of the front seat of the automobile.

When the device is swung to inactive position the same provides a guard or shield for the radiator of the automobile. When the automobile is in the path of a pedestrian or other obstacle the operator exerts a pull upon the flexible element 25 to release the latch which permits of the springs 12 influencing the scoop portion of the construction away from the guard and toward the ground. The chains 14 hold the scoop so swung and the said chains also sustain the scoop in supporting a person or obstacle therein.

Figure 4:
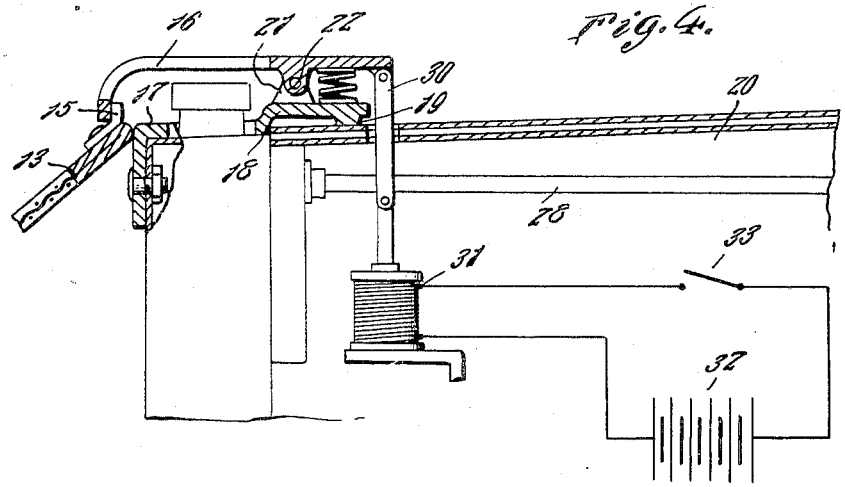
Figure 4 is a substantially similar view to Figure 3 but illustrating electric means for releasing the latch.

If desired, the latch may be released by electrical means as disclosed by Figure 4 of the drawings. In this instance a link 30 is pivotally connected to the inner end of the latch and is likewise pivotally connected to the core of a solenoid 31. The solenoid is wired to a battery 32 and the circuit is controlled by a normally open switch 33. Of course the switch is conveniently located with respect to the occupants of the front of the automobile.

If desired the lug 19 on the flanged plate 17 may be dispensed with and in lieu thereof the portion 18 of the said plate may be formed with an extension 34 that passes through an opening in the hood and merges into a concaved head 35 that is disposed over the tie rod 28. A clamp member 36 also engages the tie rod and is fixed to the head 35.

The simplicity of the construction and the advantages thereof will, it is thought, be understood and appreciated by those skilled in the art to which the said invention relates when the foregoing description has been carefully read in connection with the accompanying drawings, but I desire it understood that I do not wish to be restricted to the precise details herein set forth and, therefore, hold myself entitled to such changes therefrom as fairly fall within the scope of the appended claims.

Having described the invention, I claim:—

1. The combination with an automobile, of a front fender therefor, comprising a guard fixedly supported at the front of the automobile forward of the radiator therefor, and a scoop hingedly secured to the guard, swingable thereagainst and spring influenced therefrom, a spring influenced catch supported on the radiator to engage the scoop to hold the same in one position and means operable from the interior of the automobile for releasing the catch.

2. The combination with an automobile, of the front fender therefor, comprising a dished frame, means connecting the frame to the spring supports at the front of the automobile, and means likewise connecting the frame to the front mud guards of the automobile, a mesh facing for the frame, a second concaved frame hingedly secured to the outer end of the first mentioned frame, spring means influencing said frame away from the first mentioned frame, a mesh facing for the second mentioned frame, chain members between the frames for limiting the swinging of the second mentioned frame away from the first mentioned frame, a pivotally supported spring influenced catch on the radiator of the automobile engageable with the second mentioned frame for holding the latter against the first mentioned frame and means operable from the interior of the automobile for releasing the catch.

3. The combination with an automobile, of a fender for the front thereof, comprising a fixed dished frame at the front of the automobile forward of the radiator thereof, said fixed frame having a mesh facing, a swingable concaved frame hingedly secured to the fixed frame, spring means influencing the swingable frame away from the fixed frame, a mesh facing for the swingable frame, chain members between the frames and limiting the swinging of the swingable frame away from the fixed frame, a lip on the swingable frame, a flanged base plate secured on the radiator of the automobile, a catch member pivoted to the base plate, spring means between the base plate and catch for influencing the latter in one direction, said catch having an outer widened and slotted portion merging into a round end which is engageable with the lip of the swingable frame section, and means operable from the interior of the automobile for swinging the catch against the influence of the spring means.

In testimony whereof I affix my signature.

SAMUEL RUBIN.